(12) United States Patent
Kruglick

(10) Patent No.: US 9,740,375 B2
(45) Date of Patent: Aug. 22, 2017

(54) ROUTING WEB RENDERING TO SECONDARY DISPLAY AT GATEWAY

(71) Applicant: Empire Technology Development LLC, Wilmington, DE (US)

(72) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 202 days.

(21) Appl. No.: 14/110,119

(22) PCT Filed: Nov. 16, 2012

(86) PCT No.: PCT/US2012/065718
§ 371 (c)(1),
(2) Date: Oct. 4, 2013

(87) PCT Pub. No.: WO2014/077837
PCT Pub. Date: May 22, 2014

(65) Prior Publication Data
US 2014/0143674 A1   May 22, 2014

(51) Int. Cl.
G06F 3/048 (2013.01)
G06F 3/0484 (2013.01)
G06F 3/14 (2006.01)
G09G 5/00 (2006.01)

(52) U.S. Cl.
CPC .......... *G06F 3/0484* (2013.01); *G06F 3/1454* (2013.01); *G09G 5/003* (2013.01); *G09G 2370/022* (2013.01); *G09G 2370/20* (2013.01)

(58) Field of Classification Search
CPC .. G06F 3/0484; G06F 3/1454; G06F 3/04842; G06F 1/1647

USPC ......................................................... 715/738
See application file for complete search history.

(56) References Cited

U.S. PATENT DOCUMENTS 7,551,918 B2 * 6/2009 Bowen ................... H04N 5/782
                                                     455/186.1
2005/0125489 A1 * 6/2005 Hanes ...................... G06F 8/60
                                                      709/202
2007/0274327 A1   11/2007 Kaarela et al.
(Continued)

FOREIGN PATENT DOCUMENTS

WO         2006113711 A2   10/2006

OTHER PUBLICATIONS

Title: How to set up access control for website blocking on TP-LINK Wireless Router (older green UI)? Publisher: tp-link. Publication date: Sep. 8, 2010. URL: http://www.tp-link.us/FAQ-273.html.*

(Continued)

*Primary Examiner* — Abdullah Al Kawsar
*Assistant Examiner* — David Luu
(74) *Attorney, Agent, or Firm* — Turk IP Law, LLC

(57) ABSTRACT

Technologies are presented for routing content rendering to a secondary display at a gateway. In some examples, a gateway system may be provided through which a user device may request content. The system may receive the requested content and route it to a renderer for rendering on a secondary display. The system may also route the requested content, in its original form or in a modified form, to the user device.

18 Claims, 11 Drawing Sheets

(56) References Cited

U.S. PATENT DOCUMENTS

| | | | |
|---|---|---|---|
| 2008/0030304 A1* | 2/2008 | Doan | H04M 1/7253 340/10.1 |
| 2008/0186196 A1* | 8/2008 | Lessing | G06Q 10/109 340/686.6 |
| 2009/0106380 A1 | 4/2009 | Asthana et al. | |
| 2009/0287772 A1 | 11/2009 | Stone et al. | |
| 2011/0231771 A1* | 9/2011 | Tovar | G06F 17/30867 715/736 |
| 2011/0264817 A1 | 10/2011 | Raveendran | |
| 2012/0117458 A1* | 5/2012 | Holloway et al. | 715/234 |
| 2012/0130812 A1 | 5/2012 | Ramer et al. | |
| 2012/0159546 A1 | 6/2012 | Klein et al. | |
| 2012/0254793 A1 | 10/2012 | Briand et al. | |
| 2012/0262632 A1* | 10/2012 | Eskenazi et al. | 348/729 |
| 2013/0097533 A1* | 4/2013 | Hong et al. | 715/762 |
| 2013/0198383 A1* | 8/2013 | Tseng | H04L 63/102 709/225 |

OTHER PUBLICATIONS

"42LH200C Hotel TV Displays," accessed at https://web.archive.org/web/20120728052522/http://www.lg.com/in/for-business/displays/hotel-tv/LG-42LH200C.jsp, posted on Jul. 28, 2012, p. 1.

"Hotel Wifi JavaScript Injection," Accessed at http://web.archive.org/web/20121018071119/http://justinsomnia.org/2012/04/hotel-wifi-javascript-injection/, posted on Oct. 18, 2012, p. 12.

"Music's in the house," Accessed at http://web.archive.org/web/20121112205837/http://www.apple.com/itunes/airplay/, posted on Nov. 12, 2012, pp. 2.

Coldewey, D., "Marriott Puts an End to Shady Ad Injection Service," Accessed at http://web.archive.org/web/20121108161816/http://techcrunch.com/2012/04/09/marriott-puts-an-end-to-shady-ad-injection-service, posted on Apr. 9, 2012, pp. 2.

Heater, B., "Microsoft SmartGlass hands-on," Accessed at http://web.archive.org/web/20121106114322/http://www.engadget.com/2012/06/05/microsoft-smartglass-hands-on, posted on Jun. 5, 2012, pp. 4.

International Search Report and Written Opinion for PCT/US12/65718, filed on Nov. 16, 2012, mailed Jan. 30, 2013.

"LG"; http://www.lg.com/us/commercial/auto-sensing-remote-jack-packs, Oct. 1, 2011.

Biggs, "Now You Know: Hotels Inject Banner Ads Into The Wi-Fi They Charge You For", TechCrunch; http://techcrunch.com/2012/04/06/now-you-know-hotels-inject-banner-ads-into-the-wi-fi-they-charge-you-for/, Apr. 6, 2012.

"rXg A8 Revenue Extraction Hotspot Gateway for Hotel and WISP, 500 User"; http://www.wlanmall.com/rxg-a8-revenue-extraction-hotspot-gateway-for-hotel-and-wisp-1000-user.html, Feb. 1, 2011.

"RgNETS"; http://rgnets.com/, Aug. 5, 2010.

XMarks, A LastPass Company; http://sysmaster.com/products/iptv_switch.php, Oct. 5, 2009.

Lardinois, "Chrome for Android Gets Desktop View, Home Screen Bookmarks, File Downloads", TechCrunch, Apr. 17, 2012.

Karni, "City 'I's new phone booth, Touch screens on way"; http://www.nypost.com/p/news/local/city_new_phone_booths_VFGNinvlcNX30nID7ibKDK, New York Post, Apr. 8, 2012.

"Internet Kiosks Around the World", Technovelgy.com, where science meets fiction; http://www.technovelgy.com/ct/science-fiction-news.asp?newsnum=918, Submitted Jan. 24, 2007.

Gonzalez, "Anytime/Anywhere Digital Content During the Convergence Revolution", HDMI Case Studies, Entertainment Technology Center, May 17, 2010.

Angelini, "Intel Wireless Display: From Your Notebook to the Big Screen", Apr. 21, 2010.

"iMEDIA Application", iBAHN The Power of I, http://www.ibahn.com/en-us/index.php?cid=1631, Jul. 23, 2012.

"Sony's 2012 Smart TV Platform: Explained—TelevisionInfo.com", http://www.televisioninfo.com/News/Sony-s-2012-Smart-TV-Platform-E, Jul. 18, 2012.

* cited by examiner

ROUTING WEB RENDERING TO SECONDARY DISPLAY AT GATEWAY

CROSS-REFERENCE TO RELATED APPLICATION

This Application is the U.S. National Stage filing under 35 U.S.C. §371 of International Application No. PCT/US12/65718, filed on Nov. 16, 2012.

BACKGROUND

Unless otherwise indicated herein, the materials described in this section are not prior art to the claims in this application and are not admitted to be prior art by inclusion in this section.

The increasing availability of wireless Internet access, cloud computing, and powerful portable computing devices such as smartphones means that at least theoretically, a business traveler might just need a smartphone to perform many business tasks (e.g., email, document processing, giving presentations, etc.). However, practically speaking, the utility of a smartphone or other such portable devices may be limited by the relatively small display sizes of most of these devices.

SUMMARY

The present disclosure generally describes techniques for routing content rendering to a secondary display at a gateway.

According to some examples, a method is provided for routing content rendering to a secondary display at a gateway. The method may include receiving a content request at a redirection gateway, forwarding the request to a designated destination for servicing, receiving the content in response to the request, and either redirecting or copying the content to a renderer for rendering at a designated display device if the request is associated with a redirection.

According to other examples, a system is provided for routing content rendering to a secondary display at a gateway. The system may include a display device, a renderer, and a redirection gateway. The renderer may be configured to render content and transmit to the display device. The redirection gateway may be configured to receive a request for content, forward the request to a designated destination for servicing, receive the content in response to the request, and either redirect or copy the content to the renderer if the request is associated with a redirection.

According to further examples, a portable computing device is provided for routing content rendering to a secondary display. The portable computing device may include a communication module for communicating with a redirection gateway to connect to a facility network, a display, and a processor. The processor may be configured to instruct the redirection gateway to redirect content in response to requests to a designated display device, submit a content request, receive a full copy of the redirected content or a limited copy of the content for user input purposes, and render and display the received content at the display.

According to some examples, a computer readable medium may store instructions for routing content rendering to a secondary display at a gateway. The instructions may include receiving a content request at a redirection gateway, forwarding the request to a designated destination for servicing, receiving the content in response to the request, and either redirecting or copying the content to a renderer for rendering at a designated display device if the request is associated with a redirection.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
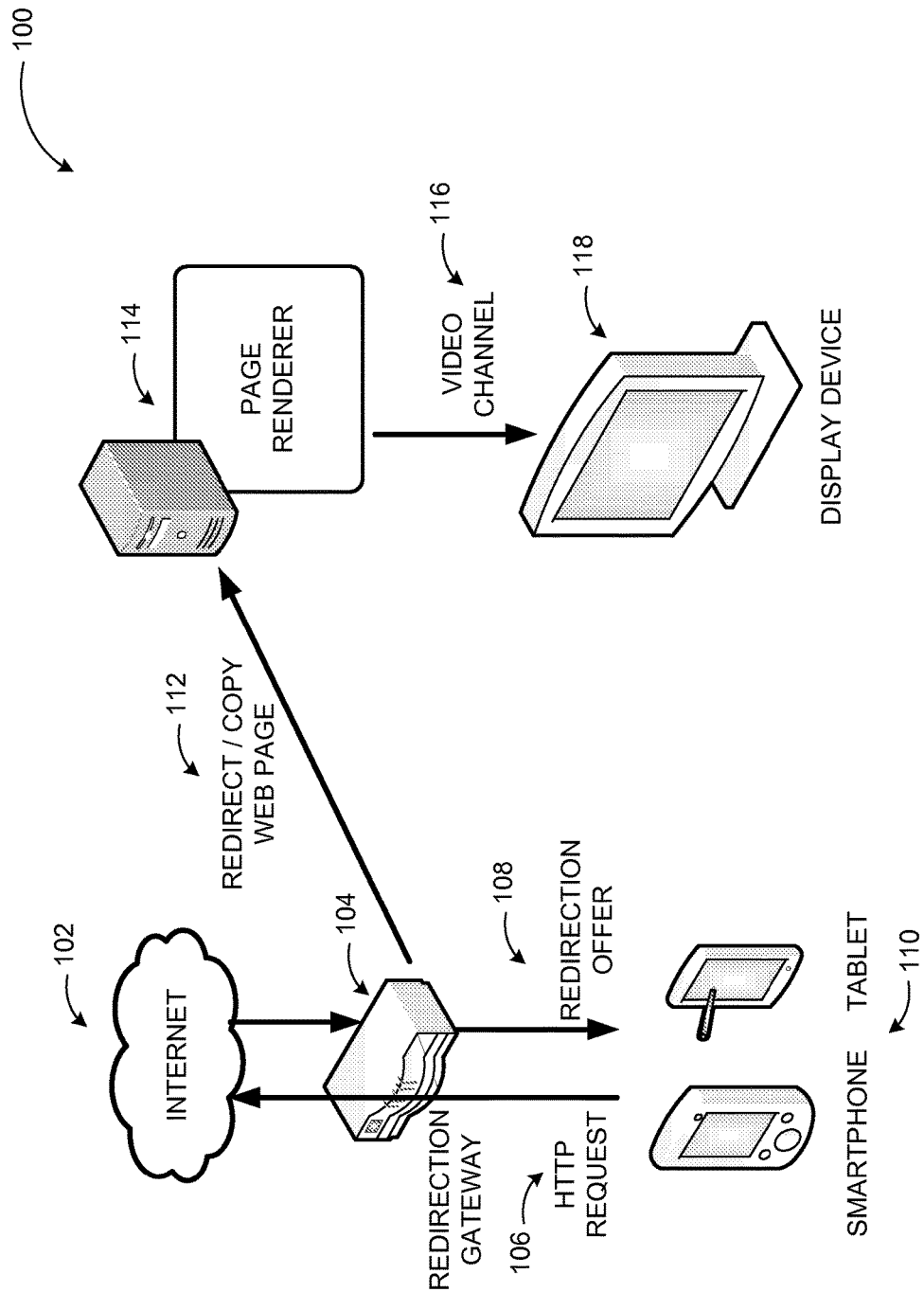
FIG. 1 illustrates an example system for routing content rendering to a secondary display at a gateway.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to routing content rendering to a secondary display at a gateway.

Briefly stated, technologies are generally described for routing content rendering to a secondary display at a gateway. In some examples, a gateway system may be provided through which a user device may request content. The system may receive the requested content and route it to a renderer for rendering on a secondary display. The system may also route the requested content, in its original form or in a modified form, to the user device.

As described above, the power of modern smartphones combined with the widespread availability of wireless Internet access and cloud computing may enable the use of smartphones for many business applications. However, the small size of typical smartphone displays may make it difficult for users to work comfortably. One potential solution is to couple a smartphone to a larger display, such as the in-room televisions present in most hotel rooms. Systems for coupling computers to televisions do exist, but they tend to involve bulky, hard-to-find, and expensive hardware, specialized cables, and familiarity with various types of data interfaces. Moreover, such systems may also provide limited functionality, merely replicating the display across the two devices regardless of differences in device capabilities.

FIG. 1 illustrates an example system for routing content rendering to a secondary display at a gateway, arranged in accordance with at least some embodiments described herein.

As shown in a diagram 100, a system for routing content to a secondary display may include a redirection gateway 104. The redirection gateway 104 may be configured to route network traffic between one or more user devices and a network 102 (e.g., the Internet). For example, a user device 110 may couple to and request content from the network 102 via, e.g., a hypertext transfer protocol (HTTP) request 106 sent through the redirection gateway 104. The user device 110 may include a portable device such as a smartphone, a tablet computer, a laptop computer, a mobile computer, a handheld computer, and/or a wearable computer. The user device 110 may also include other devices such as a desktop computer, a workstation, a game device, or any other device that has a display. As discussed above, the user device 110 may connect to the redirection gateway 104 via a wired connection (e.g., Ethernet, USB, or any other suitable wired connection) or wirelessly (e.g., WiFi, Bluetooth, cellular, or any other suitable wireless connection) in order to communicate with other devices over the network 102. The connection to the gateway 104 may be direct or through intermediate hops or connections. The connection to the gateway 104 may be established through a discovery process. For example, the gateway 104 may advertise itself as the connection point for the network 102 and allow the user device 110 to establish communication with the network 102 following a handshake/authentication protocol. Upon receiving the request for content, one or more devices coupled to the network 102 may respond to the request 106 by transmitting the requested content to the gateway 104 (because the gateway 104 is the forwarding node for the requesting user device 110), which may then forward the content to the user device 110. The communications between the user device 110 and any other devices over the network 102 (through the gateway 104) may be facilitated employing standard communication protocols such as hypertext transport protocol (HTTP) or proprietary communication protocols.

In some embodiments, the gateway 104 may also (or instead) transmit a redirection offer 108 to the user device 110. The redirection offer 108 may offer to display the requested content on a display device 118 separate from the user device 110. In some embodiments, the display device 118 may include a television, a projector, a monitor, and/or a wall display. If the redirection offer 108 is accepted, the gateway 104 may redirect 112 the received content to a page renderer 114, such as a computer or server associated with the gateway 104 and the display device 118. The page renderer 114, in turn, may render the content and transmit it to the display device 118 via a video channel 116 for display. Therefore, content requested by the user device 110 may be displayed on the secondary display device 118 without specialized interface hardware, cabling, or knowledge on the part of the user. In one example, the gateway 104 may be a routing server for a facility, where users may be offered Internet connection along with redirection of content to display devices at the facility. The page renderer 114 may be a server at the facility that receives redirected content from the gateway 104, renders the content, and transmits to a display device selected by the user. The page renderer 114 may also be a part of the display device 218 such as a rendering capable processor within a "smart" television.

In some embodiments, the video channel 116 may include a closed-circuit television (CCTV) system, such as those available in many hotels. Such CCTV systems may be capable of routing different types of programming (e.g., informational content, free content, and/or paid content) to different locations (e.g., hotel or conference rooms). In some embodiments, the rendered content may also (or instead) be transmitted to the display device 118 via a wired or wireless facility data network (e.g., Ethernet, WiFi, etc.). In yet other embodiments, the gateway may be part of a service provider such as a cable provider system and may route the rendering to the user's TV.

Figure 2:
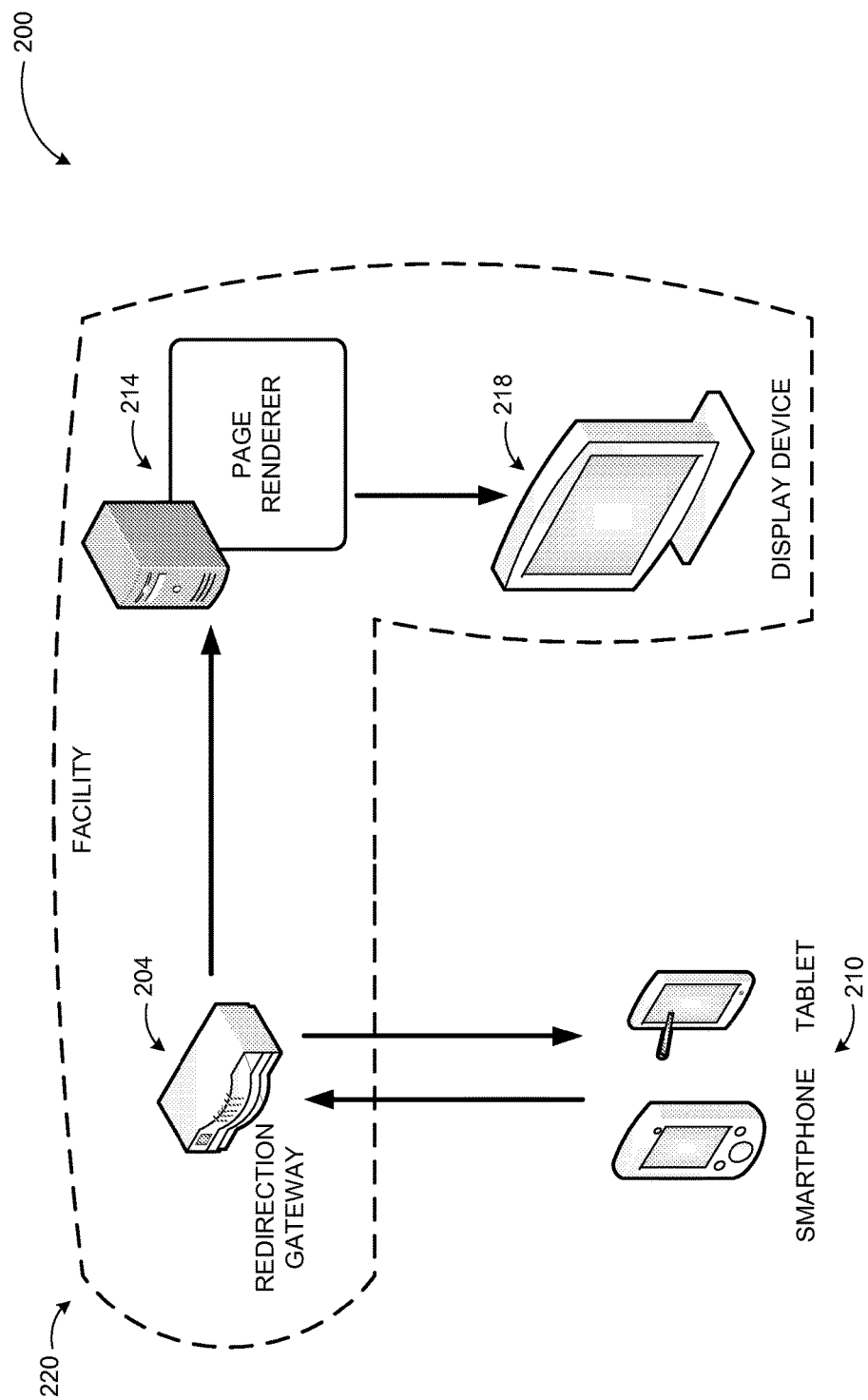
FIG. 2 illustrates components of an example system for routing content rendering to a secondary display at a gateway, where the system may be implemented in a facility such as a hotel, a conference facility, a business location, etc.

FIG. 2 illustrates components of an example system for routing content rendering to a secondary display at a gateway, where the system may be implemented in a facility such as a hotel, a conference facility, a business location, etc., arranged in accordance with at least some embodiments described herein.

In a diagram 200, a redirection gateway 204 (similar to the redirection gateway 104 in FIG. 1), a page renderer 214 (similar to the page renderer 114 in FIG. 1), and a display device 218 (similar to the display device 118 in FIG. 1) may be part of a facility 220. The redirection gateway 204 may route traffic between one or more user devices 210 (similar to the user device 110 in FIG. 1) and one or more networks (not shown), as described above in FIG. 1. The facility 220 may be a hotel, a conference facility, a business location, an enterprise facility, or a public location. In some embodiments, the facility 220 may instead be a vehicle, a residence or home, or any other suitable location.

Figure 3:
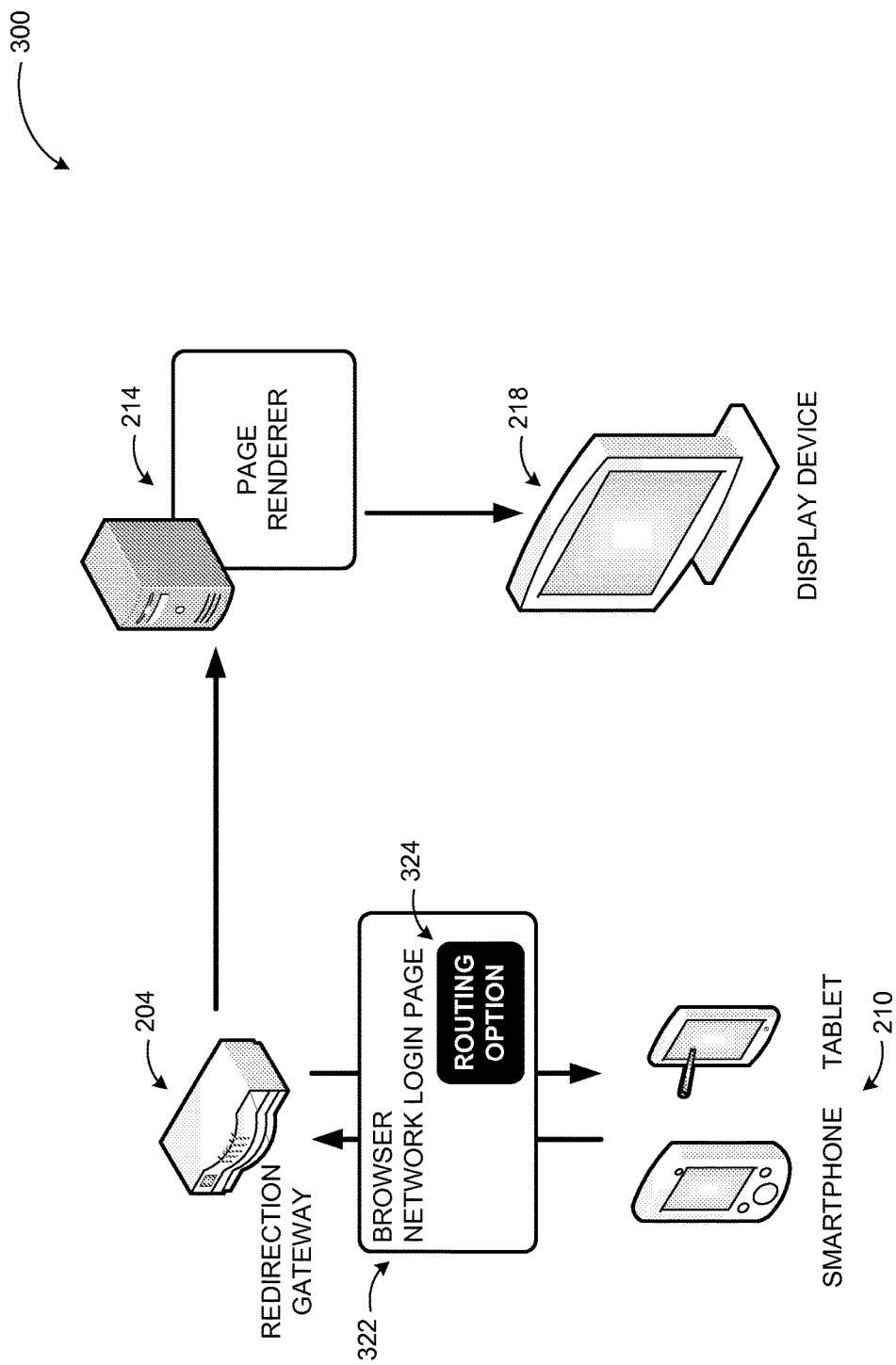
FIG. 3 illustrates one example technique for offering a user content rendering routed to a secondary display at a gateway.

FIG. 3 illustrates one example technique for offering a user content rendering routed to a secondary display at a gateway, arranged in accordance with at least some embodiments described herein.

FIG. 3 depicts a diagram 300 similar to the diagram 200 in FIG. 2, with similarly-numbered elements behaving similarly. In the diagram 300, the user device 210 may be able to request content from a network (not shown) via the redirection gateway 204 after successfully completing an authentication/authorization process managed by the redirection gateway 204. For example, when the user device 210 begins communicating with the redirection gateway 204, the redirection gateway 204 may provide a network login page 322 to the user device 210. The network login page 322 may display the organization that controls the redirection gateway 204 (e.g., the facility 220), and may ask that a user provide payment or identification as a customer before receiving network access. The network login page 322 may be provided to the user device 210 as a browser page, as a network login screen, or as any other suitable login method.

In some embodiments, the redirection gateway 204 may provide a routing option 324 in addition to the network login page 322. The routing option 324 may inform a user that content requested by the user device 210 can be rendered on a secondary display such as the display device 218, in some examples for a fee. The routing option 324 may allow the user to select whether to have requested content rendered on the display device 218 and/or whether to provide this option at a future time or date.

Figure 4:
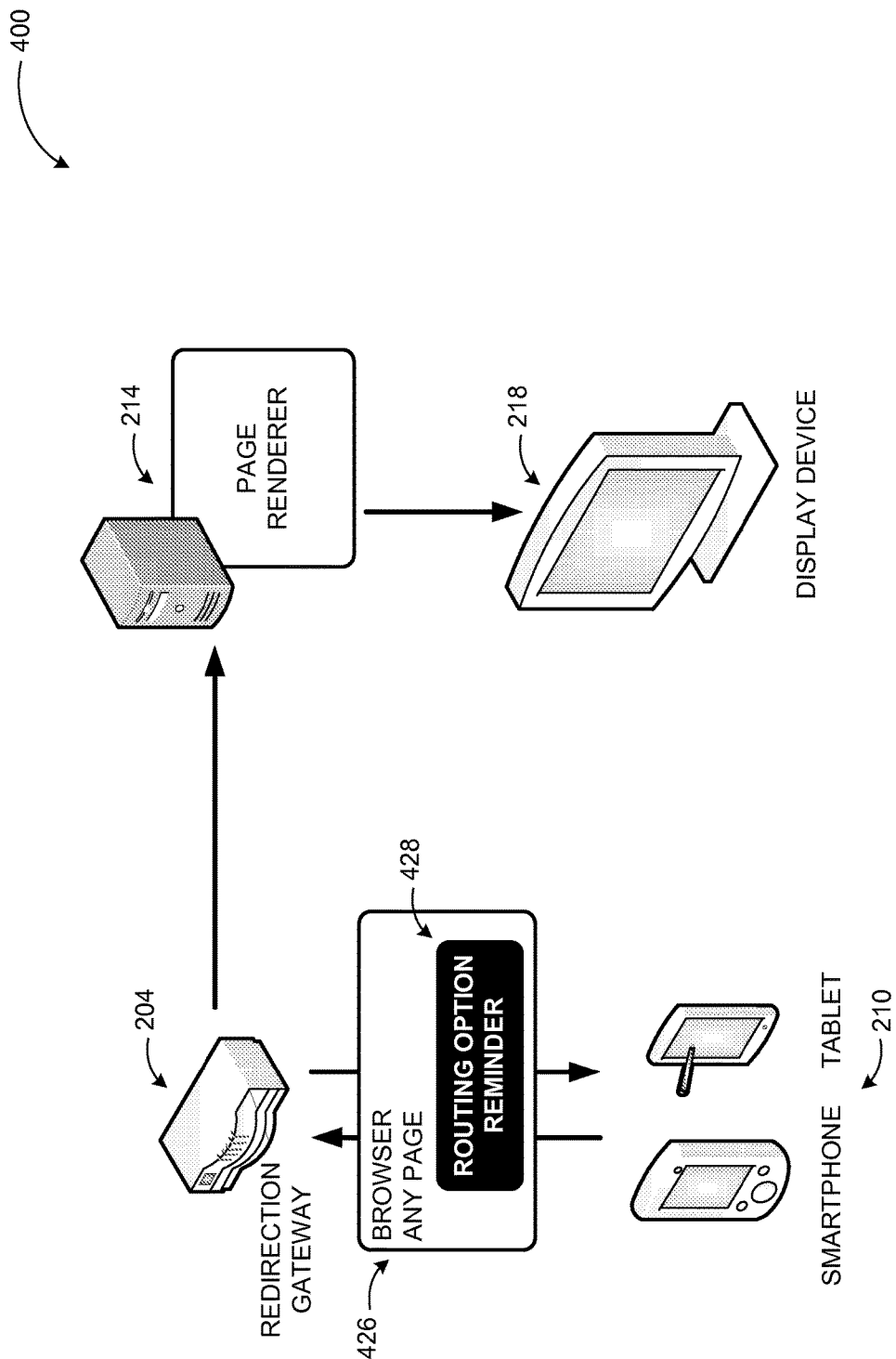
FIG. 4 illustrates another example technique for routing content rendering to a secondary display at a gateway.

FIG. 4 illustrates another example technique for routing content rendering to a secondary display at a gateway, arranged in accordance with at least some embodiments described herein.

FIG. 4 depicts a diagram 400 similar to the diagram 300 in FIG. 3, with similarly-numbered elements behaving similarly. In the diagram 400, the user device 210 may be able to request content from a network (not shown) via the redirection gateway 204. When the redirection gateway 204 receives the requested content from the network, it may provide the requested content to the user device 210 as, for example, a browser page 426. The redirection gateway 204 may also provide a routing option reminder 428, reminding a user that the browser page 426 can be rendered on the secondary display device 218. The routing option reminder 428 may be similar to the routing option 324 in FIG. 3, and may be integrated into the browser page 426 or provided as a separate browser page or screen. For example, the redirection gateway 204 may add the routing option reminder 428 as a button or panel in the browser page 426 (for example using JavaScript injection into a web page), as a pop-up browser window, as a drop-down window, as a system dialog box, or in any other suitable way. The routing option reminder 428 may be provided every time a new page or website is loaded, when certain content or types of content (e.g., certain websites) are loaded, or at certain time intervals (e.g., every hour, every 15 minutes, each new domain visited, every 5 page loads, etc.). Similar to the routing option 324 in FIG. 3, the routing option reminder 428 may allow the user to select whether to have the requested content rendered on the display device 218 and/or whether to provide this option at a future time or date.

Figure 5:
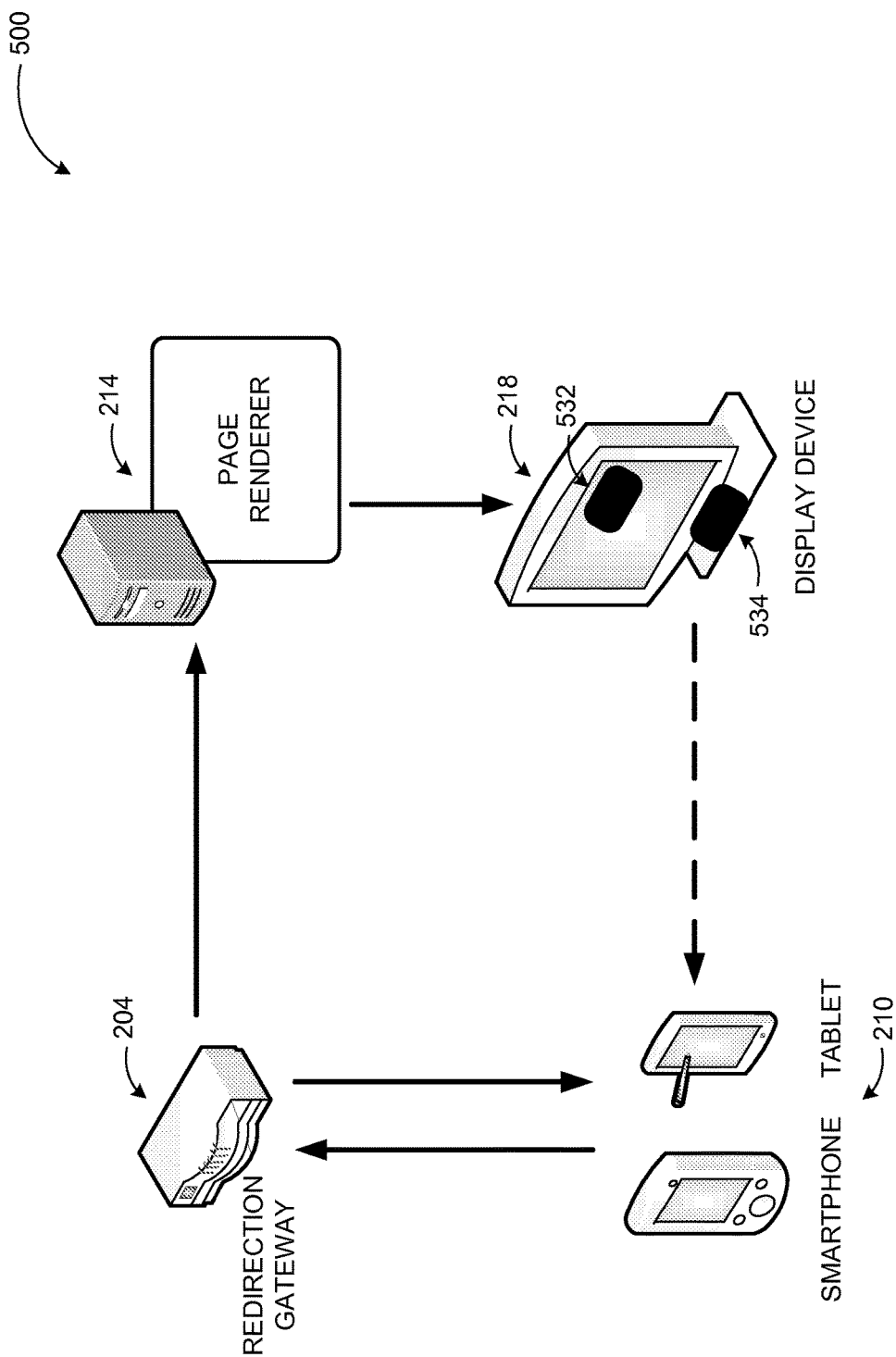
FIG. 5 illustrates a further example technique for routing content rendering to a secondary display at a gateway.

FIG. 5 illustrates a further example technique for routing content rendering to a secondary display at a gateway, arranged in accordance with at least some embodiments described herein.

FIG. 5 depicts a diagram 500 similar to the diagrams 300 and 400 in FIGS. 3 and 4. In the diagram 500, instead of or in addition to providing routing options or reminders via the user device 210, routing/redirection offers may be offered via the display device 218. For example, a physical label 534 (e.g., a sticker) on the display device 218 may indicate that content redirection is available to the display device 218. Similarly, an on-screen label 532 (e.g., a screensaver or an on-screen prompt) may be shown when the display device 218 is operating to indicate that content redirection is available. In some embodiments, the label (532 or 534) may provide a website or a particular network to which a user can navigate to or join in order to enable the content redirection functionality. The redirection gateway 204 may intercept requests to that website or network to enable the functionality, and in some embodiments, the redirection gateway 204 may be remotely managed via the website or network. The labels may be human readable and/or may incorporate device readable information such as QR-codes.

Figure 6:
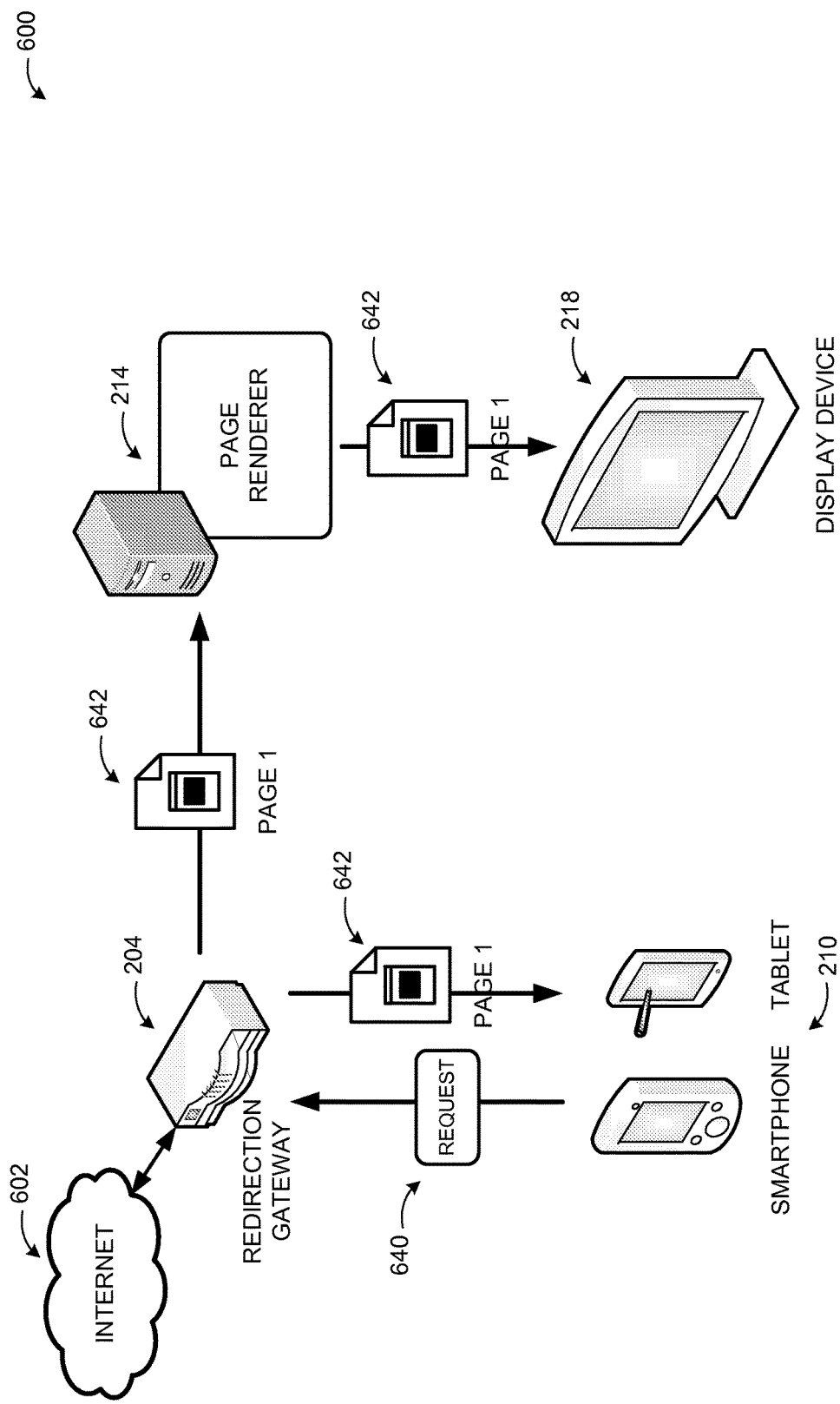
FIG. 6 illustrates one example technique for routing content rendering to a secondary display along with rendering content at a user device.

FIG. 6 illustrates one example technique for routing content rendering to a secondary display along with rendering content at a user device, arranged in accordance with at least some embodiments described herein.

FIG. 6 depicts a diagram 600 similar to the diagrams 300, 400, and 500 in FIGS. 3, 4, and 5, respectively, with similarly-numbered elements behaving similarly. In the diagram 600, a user may have enabled the redirection gateway 204 to route content rendering to the display device 218. The user device 210 may send a content request 640 to the network 602 via the redirection gateway 204. In response to the request 640, the network 602 may provide content 642, for example in the form of a webpage, to the redirection gateway 204. The redirection gateway 204 may then provide the content 642 to the user device 210. The redirection gateway 204 may also provide the content 642 to the page renderer 214, which renders the content 642 for display on the display device 218. In some embodiments, although the redirection gateway 204 may be providing the content 642 to multiple devices, the redirection gateway 204 may hold one session with a content source on the network 602, such that the content source sees the redirection gateway 204 as a single user.

Figure 7:
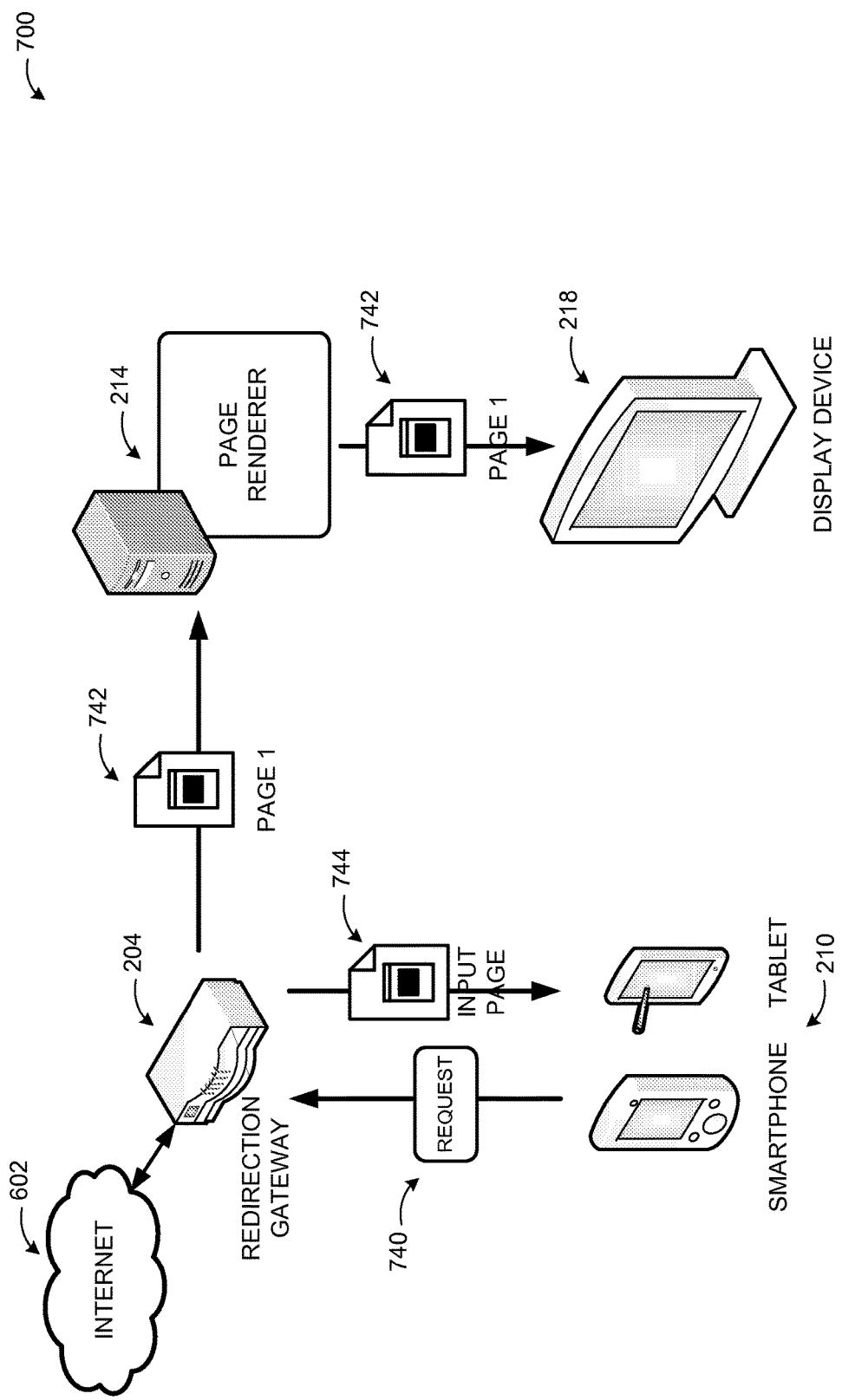
FIG. 7 illustrates another example technique for routing content rendering to a secondary display along with rendering content at a user device.

FIG. 7 illustrates another example technique for routing content rendering to a secondary display along with rendering content at a user device, arranged in accordance with at least some embodiments described herein.

FIG. 7 depicts a diagram 700 similar to the diagram 600 in FIG. 6. In the diagram 700, a user may have also enabled the redirection gateway 204 to route content rendering to the display device 218. As with FIG. 6, the user device 210 may send a content request 740 (similar to the request 640) to the network 602 via the redirection gateway 204. In response, the network 602 may provide content 742 to the redirection gateway 204, which may then provide the content 742 to the page renderer 214 for rendering on the display device 218. However, the redirection gateway 204 may provide an input page 744 instead of the content 742 to the user device 210. The input page 744 may include some of the content 742 and may be configured for display on the user device 210 to allow a user to easily navigate among input fields and/or links in the content 742. In some embodiments, the content 742 may be displayed on the display device 218 and partially (or even not be displayed) on the user device 210. As a result, any display on the user device 210 may be devoted to user input (e.g., as a keyboard, touchpad, or other input method). In situations where the user device 210 is relatively small (e.g., a smartphone or a tablet computer), the input page 744 may facilitate user input.

In some embodiments, the redirection gateway may modify the content request 740 received from the user device 210 before forwarding it to the network 602. For example, if the content request 740 is sent from a mobile device, the network 602 may respond with content optimized for mobile devices (e.g., with a smaller display resolution or user interface suitable for mobile device displays). The network 602 may determine the type of content to send based on, for example, an identifier for the user device 210 included in the content request 740 and/or a flag or indicator indicating that the user device 210 is a mobile device. If the redirection gateway 204 has been enabled to route content rendering to the display device 218, the redirection gateway 204 may modify the content request 740 such that the received content is more appropriate for the display device 218 (e.g., has a higher display resolution). For example, the redirection gateway 204 may modify a device identifier, a flag, and/or an indicator in the content request 740 to indicate that a non-mobile device (e.g., a desktop computer) is making the request. In some embodiments, the redirection gateway may also modify the content request 740 to include desired display parameters and resolutions. As a result, the network 602 may respond with content appropriate for display on the display device 218.

In some embodiments, the user device 210 may include an input application configured to facilitate user input. For example, the input application may receive the input page 744 or data corresponding to the input page 744 from the redirection gateway 204 and generate the input page 744 on the user device 210. In some embodiments, the input application may be configured to receive the requested content (e.g., the content 642 provided to the user device 210 in FIG. 6), but suppress the content rendering on the user device 210. Instead, the application may provide assistance in providing user input (e.g., provide a keyboard, touchpad, etc.) and/or navigating to input fields as they would appear rendered on the display device 218.

In some embodiments, content for the display device 218 may be rendered by the user device 210 itself, instead of the page renderer 214. For example, the user device 210 (or an application on the user device 210) may receive the content 742, render it for display on the display device 218, then send it to the display device 218 via the redirection gateway 204. In these embodiments, the page renderer 214 may not be needed at all.

Figure 8:
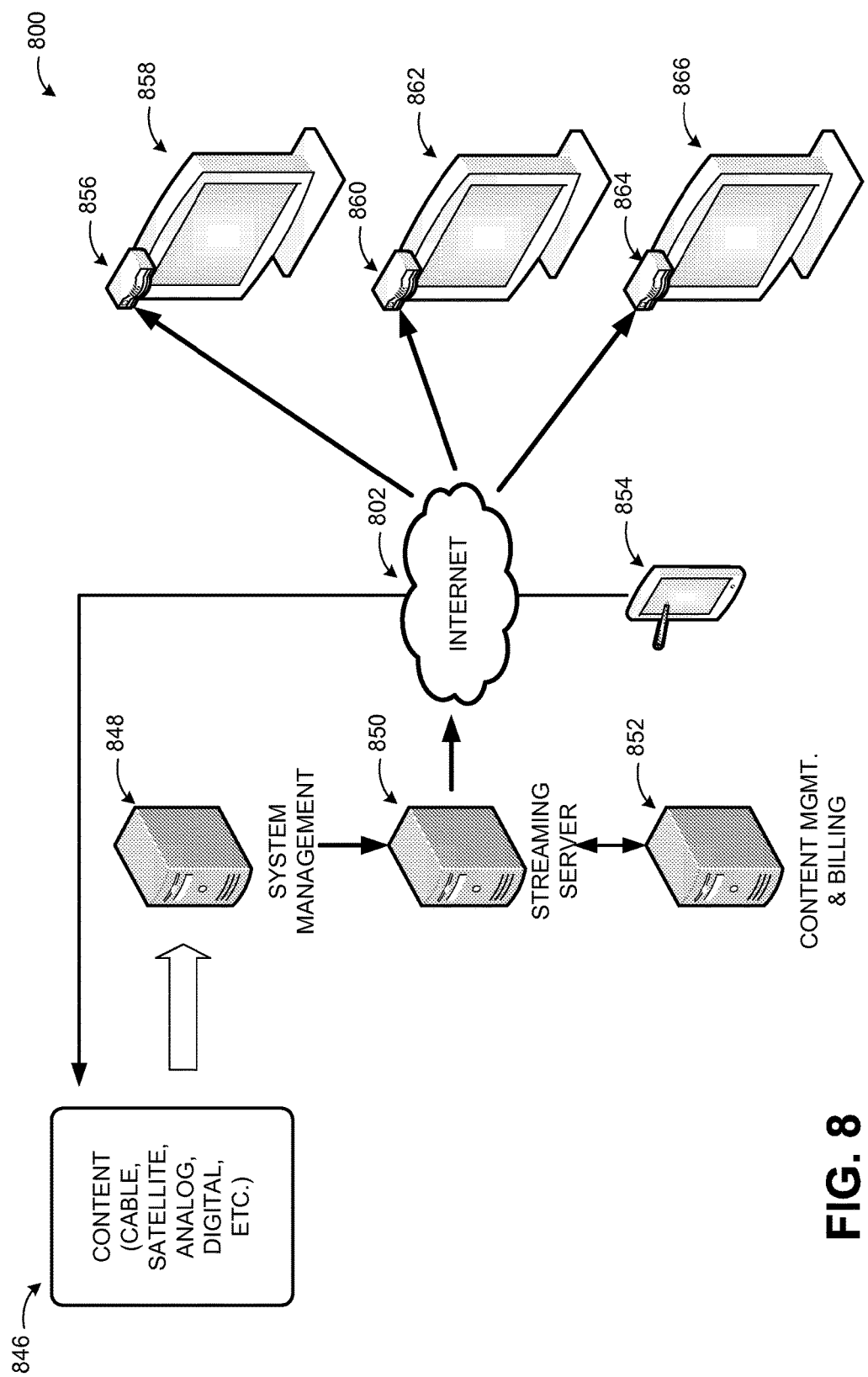
FIG. 8 illustrates an example cloud-based system for routing content rendering to a secondary display.

FIG. 8 illustrates an example cloud-based system for routing content rendering to a secondary display, arranged in accordance with at least some embodiments described herein.

As depicted in a diagram 800, a user may be able to have content rendered by a pre-existing content delivery system for delivery to one or more display devices. For example, a particular household or residence may subscribe to a content delivery service, such as an on-demand media streaming service or a combined TV/Internet service network. The content delivery service may include a system management module 848, a content management and billing module 852, and a streaming server 850. In some embodiments, the content delivery service may be a cloud-based service. A subscriber user device 854 (similar to the user device 210 in FIGS. 2-7) may request content 846 from a network 802 (e.g., the Internet) similar to the networks 102 and 602 in FIGS. 1, 6, and 7. The network 802 may provide the requested content 846 to the system management module 848, which may render the requested content 846 for display on one or more of secondary display devices 858, 862, and 866. The system management module 848 may then transmit the rendered content to the streaming server 850 for streaming to the subscriber's display devices. The streaming server 850 may communicate with the content management and billing module 852 to ensure that the rendered content is suitable for streaming to the subscriber and that the subscriber is appropriately billed if necessary. The streaming server 850 may then stream the rendered content to set-top boxes 856, 860, and 864, each of which forwards the rendered content to the display devices 858, 862, and 866, respectively.

Figure 9:
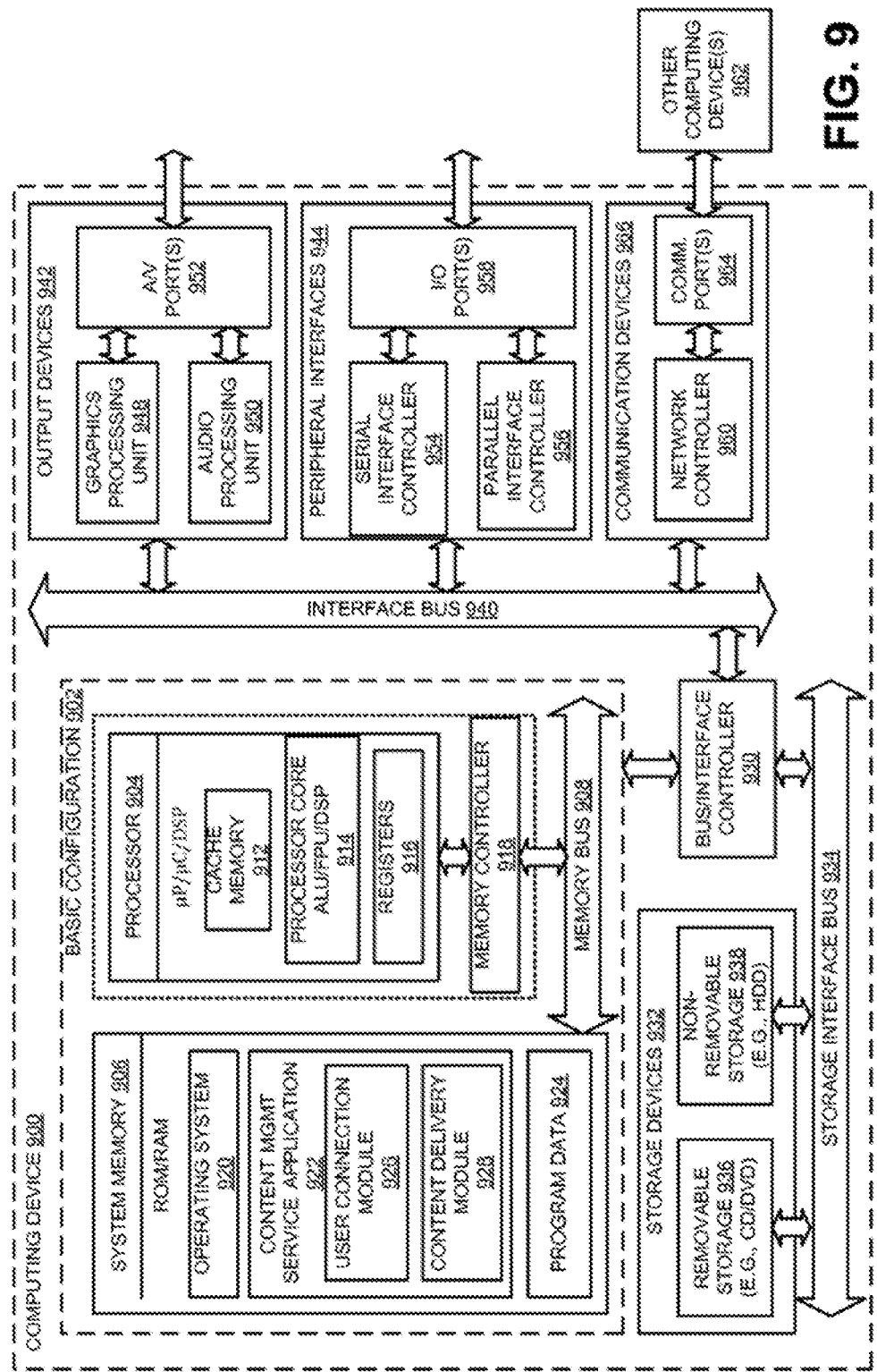
FIG. 9 illustrates a general purpose computing device, which may be used to route content rendering to a secondary display.

FIG. 9 illustrates a general purpose computing device, which may be used to route content rendering to a secondary display, arranged in accordance with at least some embodiments described herein.

For example, the computing device 900 may be used to route content rendering to a secondary display as described herein. In an example basic configuration 902, the computing device 900 may include one or more processors 904 and a system memory 906. A memory bus 908 may be used for communicating between the processor 904 and the system memory 906. The basic configuration 902 is illustrated in FIG. 9 by those components within the inner dashed line.

Depending on the desired configuration, the processor 904 may be of any type, including but not limited to a microprocessor ($\mu$P), a microcontroller ($\mu$C), a digital signal processor (DSP), or any combination thereof. The processor 904 may include one or more levels of caching, such as a cache memory 912, a processor core 914, and registers 916. The example processor core 914 may include an arithmetic logic unit (ALU), a floating point unit (FPU), a digital signal processing core (DSP core), or any combination thereof. An example memory controller 918 may also be used with the processor 904, or in some implementations, the memory controller 918 may be an internal part of the processor 904.

Depending on the desired configuration, the system memory 906 may be of any type including but not limited to volatile memory (such as RAM), non-volatile memory (such as ROM, flash memory, etc.) or any combination thereof. The system memory 906 may include an operating system 920, a content management service application 922, and program data 924. The content management service application 922 may include a user connection module 926 and a content delivery module 928 for routing content rendering to a secondary display as described herein.

The computing device 900 may have additional features or functionality, and additional interfaces to facilitate communications between the basic configuration 902 and any desired devices and interfaces. For example, a bus/interface controller 930 may be used to facilitate communications between the basic configuration 902 and one or more data storage devices 932 via a storage interface bus 934. The data storage devices 932 may be one or more removable storage devices 936, one or more non-removable storage devices 938, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 906, the removable storage devices 936 and the non-removable storage devices 938 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 900. Any such computer storage media may be part of the computing device 900.

The computing device 900 may also include an interface bus 940 for facilitating communication from various interface devices (e.g., one or more output devices 942, one or more peripheral interfaces 944, and one or more communication devices 966) to the basic configuration 902 via the bus/interface controller 930. Some of the example output devices 942 include a graphics processing unit 948 and an audio processing unit 950, which may be configured to communicate to various external devices such as a display or speakers via one or more A/V ports 952. One or more example peripheral interfaces 944 may include a serial interface controller 954 or a parallel interface controller 956, which may be configured to communicate with external devices such as input devices (e.g., keyboard, mouse, pen, voice input device, touch input device, etc.) or other peripheral devices (e.g., printer, scanner, etc.) via one or more I/O ports 958. An example communication device 966 includes a network controller 960, which may be arranged to facilitate communications with one or more other computing devices 962 over a network communication link via one or more communication ports 964. The one or more other computing devices 962 may include servers at a datacenter, customer equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 900 may be implemented as a part of a general purpose or specialized server, mainframe, or similar computer that includes any of the above functions. The computing device 900 may also be implemented as a personal computer including both laptop computer and non-laptop computer configurations.

Example embodiments may also include methods for routing content rendering to a secondary display. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 10:
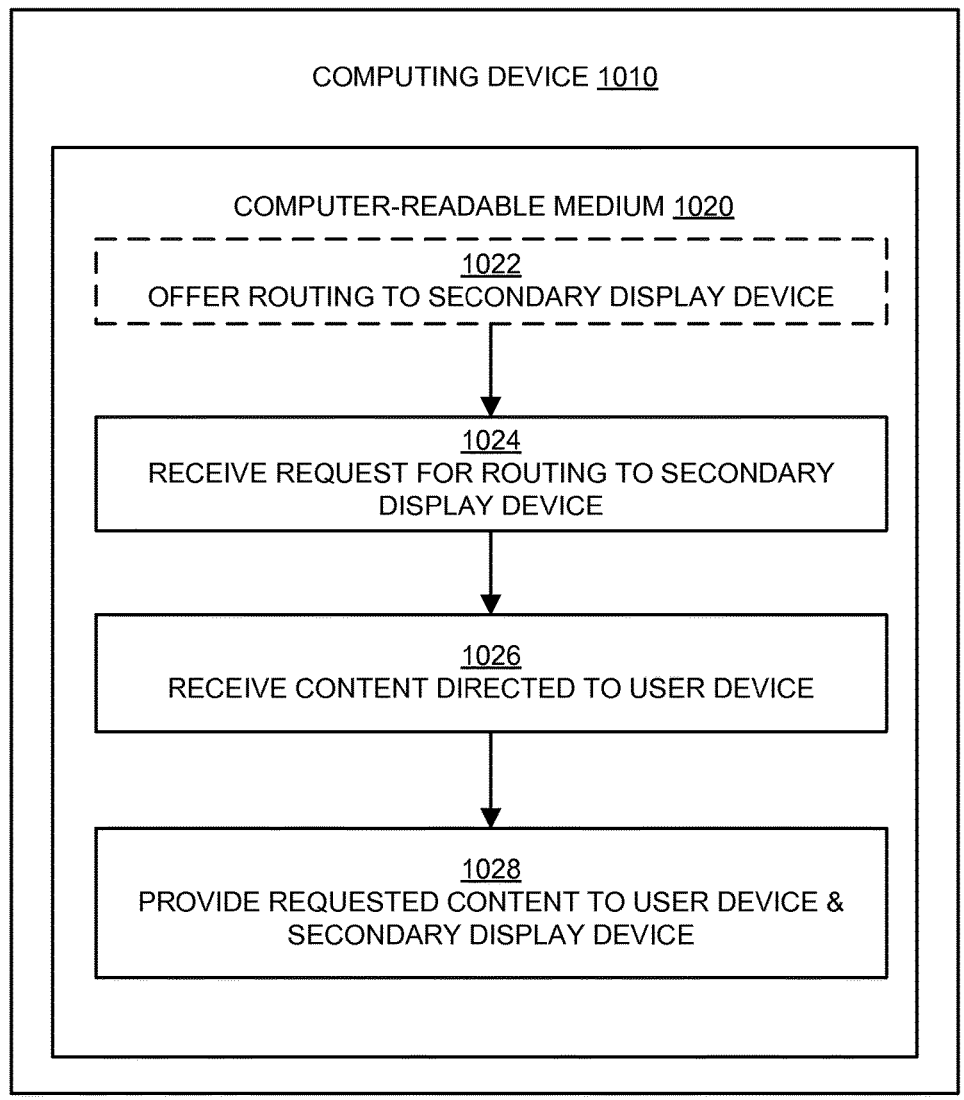
FIG. 10 is a flow diagram illustrating an example method for routing content rendering to a secondary display that may be performed by a computing device such as the computing device in FIG. 9.

FIG. 10 is a flow diagram illustrating an example method for routing content rendering to a secondary display that may be performed by a computing device such as the computing device in FIG. 9, arranged in accordance with at least some embodiments described herein.

Example methods may include one or more operations, functions or actions as illustrated by one or more of blocks 1022, 1024, 1026, and/or 1028, and may in some embodiments be performed by a computing device such as the computing device 900 in FIG. 9. The operations described in the blocks 1022-1028 may also be stored as computer-executable instructions in a computer-readable medium such as a computer-readable medium 1020 of a computing device 1010.

In some embodiments, an example process for routing content rendering to a secondary display may begin with optional block 1022, "OFFER ROUTING TO SECONDARY DISPLAY DEVICE", where a redirection offer (e.g., the redirection offer 108 in FIG. 1) may be provided to a user device requesting content via a redirection gateway. The redirection offer may offer to render the requested content on a secondary display device (e.g., the display device 118 in FIG. 1). The redirection offer may be presented to the user device when it first connects to the redirection gateway, as described in FIG. 3. The redirection offer may also (or instead) be presented when the user device loads new web content or visits a new website, as described in FIG. 4. In some embodiments, the redirection offer may be presented via a physical or on-screen label on the secondary display device, as described in FIG. 5.

Block 1022 may be followed by block 1024, "RECEIVE REQUEST FOR ROUTING TO SECONDARY DISPLAY DEVICE", where a request to route content to a secondary display device is received. The request may result from acceptance of a previous redirection offer (e.g., a redirection offer provided in optional block 1022), or may automatically result from a user device requesting content via a redirection gateway.

Block 1024 may be followed by block 1026, "RECEIVE CONTENT DIRECTED TO USER DEVICE", where the redirection gateway may receive content requested by the user device. For example, the user device may connect to a network (e.g., the networks 102 and 602 in FIGS. 1, 6, and 7) via the redirection gateway, and may request network content via the redirection gateway. The redirection gateway may receive the content request from the user device and forward the request on to the network. In response, the network may provide the requested content to the redirection gateway. In some embodiments, the redirection gateway may first modify the content request (e.g., to account for display capabilities) before forwarding the request on to the network.

Finally, block 1026 may be followed by block 1028, "PROVIDE REQUESTED CONTENT TO USER DEVICE & SECONDARY DISPLAY DEVICE", where the redirection gateway may provide the content received from the network to the user device and the secondary display device. For example, the redirection gateway may provide the content to the user device and a content renderer (e.g., the page renderer 214 in FIG. 6) for rendering and display on the secondary display device (e.g., the display device 218 in FIG. 6). In some embodiments, the redirection gateway may instead provide modified content (e.g., the input page 744 in FIG. 7) to the user device while rendering the received content on the secondary display device.

Figure 11:
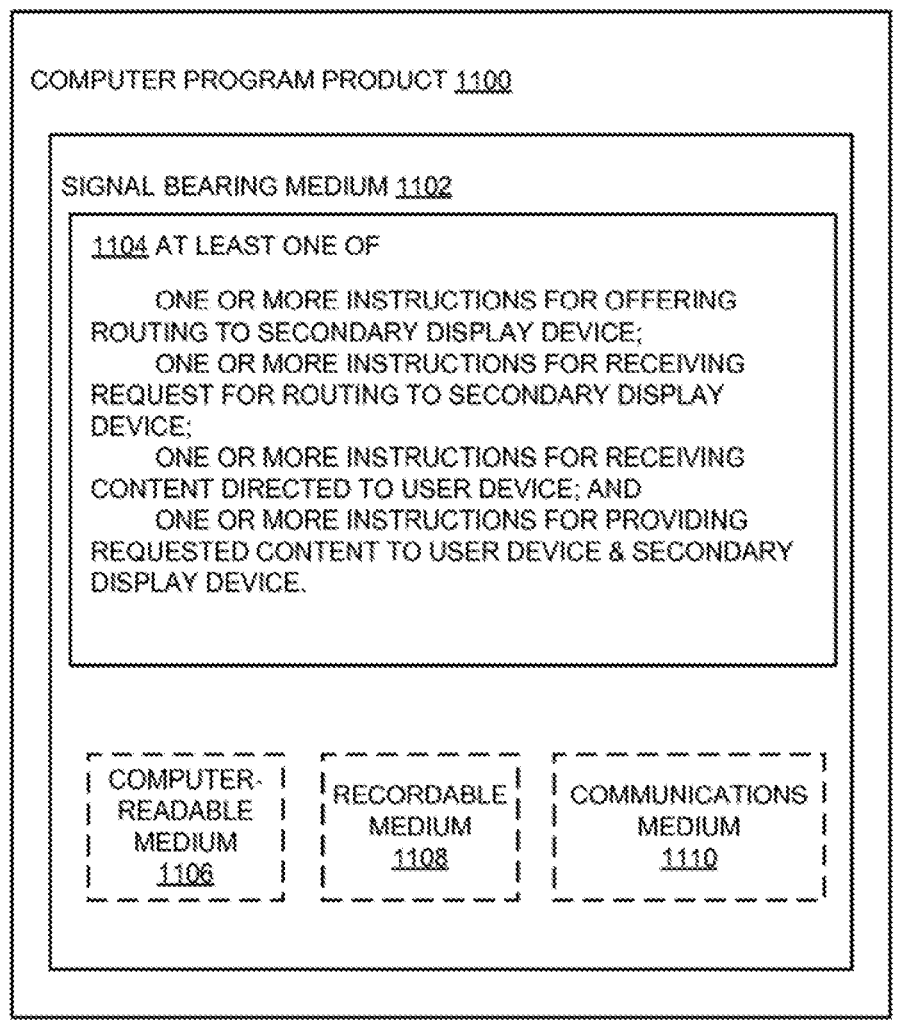
FIG. 11 illustrates a block diagram of an example computer program product, all arranged in accordance with at least some embodiments described herein.

FIG. 11 illustrates a block diagram of an example computer program product, arranged in accordance with at least some embodiments described herein.

In some examples, as shown in FIG. 11, the computer program product 1100 may include a signal bearing medium 1102 that may also include one or more machine readable instructions 1104 that, when executed by, for example, a processor, may provide the functionality described herein. Thus, for example, referring to the processor 904 in FIG. 9, the content management service application 922 may undertake one or more of the tasks shown in FIG. 11 in response to the instructions 1104 conveyed to the processor 904 by the signal bearing medium 1102 to perform actions associated with routing content rendering to a secondary display as described herein. Some of those instructions may include, for example, offering routing to a secondary display device, receiving a request for routing to a secondary display device, receiving content directed to a user device, and providing requested content to the user device and the secondary display device, according to some embodiments described herein.

In some implementations, the signal bearing medium 1102 depicted in FIG. 11 may encompass a computer-readable medium 1106, such as, but not limited to, a hard disk drive (HDD), a solid state drive (SSD), a Compact Disc (CD), a Digital Versatile Disk (DVD), a digital tape, memory, etc. In some implementations, the signal bearing medium 1102 may encompass a recordable medium 1108, such as, but not limited to, memory, read/write (R/W) CDs, R/W DVDs, etc. In some implementations, the signal bearing medium 1102 may encompass a communications medium 1110, such as, but not limited to, a digital and/or an analog communication medium (e.g., a fiber optic cable, a waveguide, a wired communication link, a wireless communication link, etc.). Thus, for example, the computer program product 1100 may be conveyed to one or more modules of the processor 904 by an RF signal bearing medium, where the signal bearing medium 1102 is conveyed by the wireless communications medium 1110 (e.g., a wireless communications medium conforming with the IEEE 802.11 standard).

According to some examples, a method for routing content rendering to a secondary display includes receiving a content request at a redirection gateway, forwarding the request to a designated destination for servicing, receiving the content in response to the request, and either redirecting or copying the content to a renderer for rendering at a designated display device if the request is associated with a redirection.

According to some embodiments, the method may further include presenting a display redirection offer upon either enabling a user device to connect to a facility network or receiving the content. The method may also include providing a copy of the received content to a requesting user device and/or providing a limited copy of the received content to a requesting user device for enabling input while a full copy of the received content is provided to the designated display device. The user device may be a smartphone, a tablet computer, a laptop computer, a mobile computer, a handheld computer, a desktop computer, and/or a wearable computer.

According to other embodiments, forwarding the request to a designated destination for servicing may include forwarding the request via the Internet. The renderer may be an on-facility server. The method may further include rendering the content and transmitting to the designated display device through a video channel or a facility data network. The video channel may be a closed-circuit television (CCTV) system channel, and the designated display device may be a television, a projector, a monitor, or a wall display.

According to further embodiments, the method may include modifying screen information and mobile-or-desktop flags in the content request at the redirection gateway to acquire content suitable for the designated display device. The method may further include presenting a display redirection offer at predefined time intervals through a web browser at a user device, presenting a display redirection offer through a physical label and/or an on-screen label on the designated display device, and/or holding a session with the designated destination at the redirection gateway. The redirection gateway may be part of a hotel, a conference facility, an enterprise facility, a communications provider, a transportation vehicle, and/or a public location with redirection service, and/or may be part of a home network combining a TV network and an Internet service network.

According to other examples, a system for routing content rendering to a secondary display may include a display device, a renderer, and a redirection gateway. The renderer may be configured to render a content and transmit to the display device. The redirection gateway may be configured to receive a request for content, forward the request to a designated destination for servicing, receive the content in response to the request, and either redirect or copy the content to the renderer if the request is associated with a redirection.

According to some embodiments, the system may be further configured to present a display redirection offer upon either enabling a user device to connect to a facility network or receiving the content. The system may also be configured to provide a copy of the received content to a requesting user device and/or provide a limited copy of the received content to a requesting user device for enabling input while a full copy of the received content is provided to the display device. The user device may be a smartphone, a tablet computer, a laptop computer, a mobile computer, a handheld computer, a desktop computer, and/or a wearable computer.

According to other embodiments, the redirection gateway may be configured to forward the request to the designated destination for servicing by forwarding the request via the Internet. The renderer may be an on-facility server. The system may be further configured to render the content and transmit to the display device through a video channel or a facility data network. The video channel may be a closed-circuit television (CCTV) system channel, and the display device may be a television, a projector, a monitor, or a wall display.

According to further embodiments, the redirection gateway may be further configured to modify screen information and mobile-or-desktop flags in the content request to acquire content suitable for the display device. The redirection gateway may be further configured to present a display redirection offer at predefined time intervals through a web browser at a user device, present a display redirection offer through a physical label and/or an on-screen label on the display device, and/or hold a session with the designated destination. The redirection gateway may be part of a hotel, a conference facility, an enterprise facility, a transportation vehicle, and/or a public location with redirection service, and/or may be part of a home network combining a TV network and an Internet service network.

According to further examples, a portable computing device for routing content rendering to a secondary display may include a communication module for communicating with a redirection gateway to connect to a facility network, a display, and a processor. The processor may be configured to instruct the redirection gateway to redirect content in response to requests to a designated display device, submit a content request, receive a full copy of the redirected content or a limited copy of the content for user input purposes, and render and display the received content at the display.

According to some embodiments, the processor may be further configured to instruct the redirection gateway to redirect the content upon receiving a display redirection offer from the redirection gateway upon first connecting to the facility network and/or at predefined time intervals. The processor may also be configured to suppress content rendering on the portable computing device while providing assistance in navigating to appropriate input fields as they appear on the designated display device.

According to other embodiments, the processor may be further configured to manage connections and preferences with the redirection gateway and/or request the content in a "desktop" mode once the redirection is established. The portable computing device may be a smartphone, a tablet computer, a laptop computer, a mobile computer, a handheld computer, or a wearable computer. The designated display device may be a television, a projector, a monitor or a wall-display.

According to yet further examples, a computer-readable storage medium may store instructions for routing content rendering to a secondary display. The instructions may include receiving a content request at a redirection gateway, forwarding the request to a designated destination for servicing, receiving the content in response to the request, and either redirecting or copying the content to a renderer for rendering at a designated display device if the request is associated with a redirection.

According to some embodiments, the instructions may further include presenting a display redirection offer upon either enabling a user device to connect to a facility network or receiving the content. The instructions may also include providing a copy of the received content to a requesting user device and/or providing a limited copy of the received content to a requesting user device for enabling input while a full copy of the received content is provided to the designated display device. The user device may be a smartphone, a tablet computer, a laptop computer, a mobile computer, a handheld computer, a desktop computer, and/or a wearable computer.

According to other embodiments, forwarding the request to a designated destination for servicing may include forwarding the request via the Internet. The renderer may be an on-facility server. The instructions may further include rendering the content and transmitting to the designated display device through a video channel or a facility data network. The video channel may be a closed-circuit television (CCTV) system channel, and the designated display device may be a television, a projector, a monitor, or a wall display.

According to further embodiments, the instructions may include modifying screen information and mobile-or-desktop flags in the content request at the redirection gateway to acquire content suitable for the designated display device. The instructions may further include presenting a display redirection offer at predefined time intervals through a web browser at a user device, presenting a display redirection offer through a physical label and/or an on-screen label on the designated display device, and/or holding a session with the designated destination at the redirection gateway. The redirection gateway may be part of a hotel, a conference facility, an enterprise facility, a transportation vehicle, and/or a public location with redirection service, and/or may be part of a home network combining a TV network and an Internet service network.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors for moving and/or adjusting components and/or quantities).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to route content rendering to a secondary display, the method comprising:
receiving, from a user device, a content request at a redirection gateway;
forwarding, by the redirection gateway, the content request as a modified content request to a designated destination to provide service via Internet;
receiving, at the redirection gateway, content that is modified in response to the modified content request, wherein the modified content includes content with an increased display resolution as compared to a display resolution of the user device, and wherein the increased display resolution is suitable to display the modified content at a designated display device;
in response to receipt of the modified content, presenting, via the redirection gateway, a display redirection offer that displays an offer to redirect the modified content to the designated display device and an option to receive the display redirection offer at a future time through the user device, wherein the display redirection offer and the option are also presented through the designated display device as an on-screen label that provides a particular network to join in order to enable content redirection; and
in response to a determination that the display redirection offer is accepted:
one of redirecting or copying the modified content to a renderer on an on-facility server to render the modified content at the designated display device, wherein the modified content is rendered at the designated display device by transmission of the modified content to the designated display device through a video channel; and
providing a copy of requested content to the user device; else:
in response to a determination that the display redirection offer is not accepted, representing the display redirection offer to redirect the modified content to the designated display device and the option to receive the display redirection offer at the future time through the user device each time a page or a website that includes a specified type of content is loaded on the user device, wherein the display redirection offer and the option are added as a button or a panel in the page or the website.

2. The method of claim 1, wherein the video channel includes a closed-circuit television (CCTV) system channel that is provided by a hotel.

3. The method of claim 1, wherein the designated display device includes one of a television, a projector, a monitor, or a wall-display.

4. The method of claim 1, wherein presenting the display redirection offer includes presenting the display redirection offer at time intervals through a web browser at the user device.

5. The method of claim 1, wherein the redirection gateway is part of one of a conference facility, an enterprise facility, a transportation vehicle, or a public location with redirection service.

6. The method of claim 1, wherein the redirection gateway is part of a home network that combines a television (TV) network and an Internet service network.

7. A system to route content rendering to a secondary display, the system comprising:
a display device;
a first server associated with the display device, wherein the first server is configured to render content and transmit the content to the display device; and
a second server communicatively coupled to the first server, wherein the second server is configured to:
provide an authentication page that requests identification and requests payment;
receive a content request, from a user device, for the content;
modify at least one of a device identifier, a flag, and an indicator included in the content request to acquire content suitable for the display device;
forward the modified content request to a designated destination to provide service;
receive the content, which is modified in response to the modified content request, wherein the modified content includes content with an increased display resolution as compared to a display resolution of the user device, and wherein the increased display resolution is suitable to display the modified content at the display device;
in response to receipt of the modified content, present a display redirection offer that displays an offer to redirect the modified content to the display device and an option to receive the display redirection offer at a future time through the user device, wherein the display device is configured to present the display redirection offer and the option as an on-screen label that provides a particular network to join in order to enable content redirection; and
in response to a determination that the display redirection offer is accepted:
redirect or copy the modified content to the first server; and
provide a limited copy of the requested content to the user device while a copy of the modified content is provided to the display device by the first server; else:
in response to a determination that the display redirection offer is not accepted, represent the display redirection offer to redirect the modified content to the display device and the option to receive the display redirection offer at the future time through the user device each time a page or a website that includes a specified type of content is loaded on the user device, wherein the display redirection offer and the option are added as a button or a panel in the page or the website.

8. The system of claim 7, wherein the first server includes an on-facility server.

9. The system of claim 8, wherein the first server is configured to render the modified content and transmit the rendered content to the display device through one of a video channel or a facility data network.

10. The system of claim 9, wherein the video channel includes a closed circuit television (CCTV) system channel.

11. The system of claim 9, wherein the display device includes one of a television, a projector, a monitor, or a wall-display.

12. The system of claim 7, wherein the second server is further configured to hold a session with the designated destination.

13. The system of claim 7, wherein the second server is part of one of a hotel, a conference facility, an enterprise facility, a transportation vehicle, or a public location with redirection service.

14. The system of claim 7, wherein the second server is part of a home network that combines a television (TV) network and an Internet service network.

15. A portable computation device to route content rendering to a secondary display, the portable computation device comprising:
- a communication device configured to facilitate communication with a server to connect to a facility network;
- a display;
- a processor coupled to the display and to the communication device, the processor configured to:
  - provide identification and payment through an authentication page received from the server;
  - transmit a content request through the server to a designated destination to provide service via internet, wherein
  - the server transmits the content request as a modified content request to the designated destination;
  - receive, from the server and in response to receipt of the modified content request by the designated destination, a display redirection offer that displays an offer to redirect content to a designated display device and an option to receive the display redirection offer at a future time, wherein:
    - the content is modified by the designated destination to include content with an increased display resolution as compared to a display resolution of the display of the portable computation device, and wherein the increased display resolution is suitable to display the modified content at the designated display device,
    - the display is configured to present the display redirection offer and the option, and wherein the display redirection offer and the option are also presented through the designated display device via an on-screen label that provides a particular network to join in order to enable content redirection;
  - in response to an acceptance of the display redirection offer during a first connection to the facility network via the server or at particular time intervals:
    - instruct the server to redirect the modified content to the designated display device; and
    - receive one of a copy of redirected content or a limited copy of the modified content for user input purposes; else:
    - re-receive the display redirection offer to redirect the modified content to the designated display device and the option to receive the display redirection offer at the future time each time a page or a website that includes a specified type of content is loaded on the portable computation device, wherein the display redirection offer and the option are added as a button or a panel in the page or the web site; and
- a graphics processor coupled to the processor and the display, wherein the graphics processor is configured to:
  - render the received content at the display of the portable computation device; and
  - suppress the received content from being rendered on the portable computation device while assistance in navigation to appropriate input fields is provided as the input fields appear on the designated display device.

16. The portable computation device of claim 15, wherein the processor is further configured to manage connections and preferences with the server.

17. The portable computation device of claim 15, wherein the portable computation device includes one of a smartphone, a tablet computer, a laptop computer, a mobile computer, a handheld computer, or a wearable computer.

18. The portable computation device of claim 15, wherein the designated display device includes one of a television, a projector, a monitor, or a wall-display.

* * * * *